United States Patent [19]

Sharma et al.

[11] Patent Number: 4,906,810
[45] Date of Patent: Mar. 6, 1990

[54] METHOD AND A DEVICE FOR THE MANUFACTURING OF AN OPTICAL COUPLER

[75] Inventors: Awnashilal B. Sharma, Vantaa; Ari Virekunnas; Pekka Rissanen, both of Tampere, all of Finland

[73] Assignee: Oy Nokia AB, Helsinki, Finland

[21] Appl. No.: 257,675

[22] Filed: Oct. 14, 1988

[30] Foreign Application Priority Data

Oct. 16, 1987 [FI] Finland ................................ 874562

[51] Int. Cl.⁴ ................................................. B23K 9/00
[52] U.S. Cl. ........................... 219/121.46; 219/121.45; 219/121.59; 350/96.2; 350/96.21
[58] Field of Search .......... 219/137 R, 121.45, 121.46; 350/96.15, 96.16, 96.2, 96.21, 96.22

[56] References Cited

U.S. PATENT DOCUMENTS

| | | | |
|---|---|---|---|
| 3,810,802 | 5/1974 | Bubite et al. | 350/96.21 |
| 4,049,414 | 9/1977 | Smith | 350/96.21 |
| 4,274,707 | 6/1981 | Pacey et al. | 350/96.21 |
| 4,383,844 | 5/1983 | Kashima et al. | 219/383 |
| 4,598,974 | 7/1986 | Munn et al. | 350/96.21 |
| 4,664,732 | 5/1987 | Campbell et al. | 350/96.21 |
| 4,666,234 | 5/1987 | Emkey | 350/96.15 |
| 4,727,237 | 2/1988 | Schantz | 350/96.21 |

FOREIGN PATENT DOCUMENTS

| | | |
|---|---|---|
| 0123396 | 3/1984 | European Pat. Off. |
| 0215145 | 9/1985 | European Pat. Off. |
| 0234326 | 1/1987 | European Pat. Off. |
| 60-61705A | 4/1985 | Japan |
| 2118319A | 3/1983 | United Kingdom |
| 2180369A | 9/1986 | United Kingdom |

Primary Examiner—M. H. Paschall
Attorney, Agent, or Firm—Finnegan, Henderson, Farabow, Garrett and Dunner

[57] ABSTRACT

The invention relates to a method for the manufacture of optical couplers, comprising the steps of (a) removing the jacket material over a short distance from two or more optical fibres, (b) bringing the jacketless portions of the optical fibers in contact with each other, (c) fusing the optical fibers together within the contact area and drawing them into tapers. In order that the process would be simpler and easier to control, the method according to the invention is characterized in that the optical fibers are fused by heating them by means of an arc substantially parallel to the optical fibers. The arc is excited in a chamber confined in the direction of the radius of the fibers, and it is excited and extinguished at a low frequency so that the arc strikes at arbitrarily varying points around the fibers. The invention also concerns an oven for fusing fibers, comprising a fusion chamber extending through a ceramic body and provided at both ends thereof with an electric electrode for producing within the chamber an arc parallel to optical fibers arranged to be led through the chamber to be fused together.

14 Claims, 2 Drawing Sheets

METHOD AND A DEVICE FOR THE MANUFACTURING OF AN OPTICAL COUPLER

FIELD OF THE INVENTION

The invention relates to a method for the manufacture of optical couplers, comprising the steps of: (a) removing the jacket material over a short distance from two or more optical fibres, (b) bringing the jacketless portions of the optical fibers in contact with each other, (c) fusing the optical fibers together within the contact area, and drawing them into tapers. The invention is also concerned with an oven to be used in the manufacture of optical couplers.

BACKGROUND OF THE INVENTION

Manufacturing methods of the type described above are generally referred to as "fused tapered" methods. In most cases a gas flame is used at the fusing step for fusing together the optical fibers. The gas flame, however, is slow and difficult to adjust. The use of a tungsten glow filament as a source of heat has also been studied, but this, too, requires a vacuum or a shielding gas. Methods for the manufacture of optical couplers are disclosed e.g. in the following publications: FR 850,919, GB 846,274, AU 8,289,666, GB 2,112,165, US 222,113 and US 4,400,055.

SUMMARY OF THE INVENTION

The object of the invention is to provide a simpler and more easily controllable way of manufacturing high-quality optical couplers and to improve the yield of the production.

A further object of the invention is to provide an apparatus for realizing the method according to the invention.

This is achieved by means of a method according to the first paragraph of the specification. In the method, optical fibers are melted by heating them by means of an arc substantially parallel to the optical fibers.

The basic idea of the invention is that an arc is used for fusing the fibers. However, the Applicant has found in his experiments that an arc burning perpendicularly to the fiber, used in fiber elongation devices for forming abutment joints, results in too narrow a hot zone. For broadening this hot zone, an arc substantially parallel to the fiber is required.

Since the arc tends to proceed from one electrode to the other along a path consuming as little energy as possible, it seeks a direction away from the cold fiber. Therefore, in one embodiment of the method according to the invention, the arc is forced close to the fiber by producing an arc in a chamber the size of which is limited in the radial direction of the fiber.

If the arc burns on one side of the fiber only, this may result in that the fiber melts unevenly or is burnt off. In one preferred embodiment of the invention, the arc is therefore cut off at low frequencies, whereby the arc is excited and extinguished at arbitrary points around the axis of the fiber in the chamber, so that the heat of the arc is directed evenly to the fiber positioned in the middle.

A d.c. or a.c. arc can be used for heating the optical fiber.

One advantage of the present method is that the arc is easily controllable electrically by means of a high-voltage unit supplying the electrodes. For instance, the heating of the fiber can be ended rapidly and accurately, when the coupling of the fibers takes place. The efficiency of the arc, too, is easily adjustable. The arc does not necessarily require the use of a vacuum or a shielding gas, and the apparatus adjusting the arc can be fairly simple.

The invention is further concerned with an oven comprising a fusion chamber extending through a ceramic body and provided at both ends thereof with an electric electrode for producing within the fusion chamber an arc parallel to the optical fibers to be led through the chamber so as to be fused together.

In the preferred embodiment, the ceramic body is a disc made of Macor ® and provided with a central hole forming the fusion chamber. On both sides of the ceramic disc there is provided an electric electrode plate made of tungsten and comprising a hole which is in alignment with the hole forming the fusion chamber.

The oven according to the invention is simple and need not be enclosed in a vacuum, for instance, nor surrounded with a shielding gas. The arc can be controlled electrically by a relatively simple apparatus and the properties of the couplers to be manufactured can be determined accurately, which leads to an improved quality of couplers and a higher yield of the production. Also, the reproducibility of the manufacture of couplers is improved.

Brief Description of the Drawings

The invention will be described in the following with reference to the attached drawing, wherein.

THE PREFERRED EMBODIMENT OF THE INVENTION

Figures 1, 2:
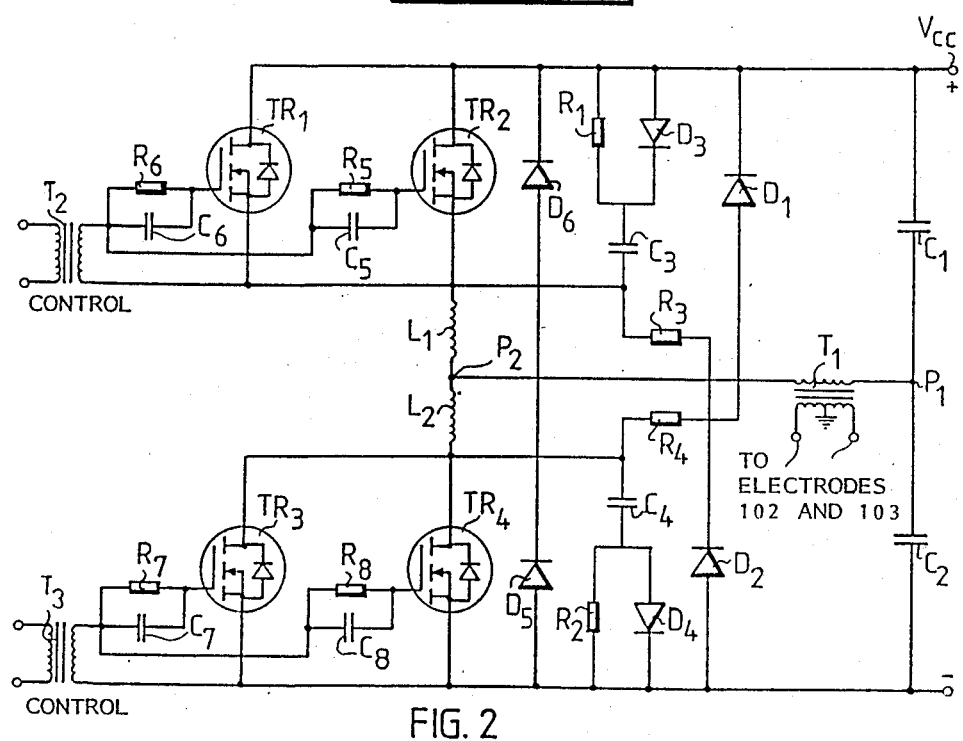
FIG. 1 shows the preferred embodiment of an oven according to the invention.
FIG. 2 shows a high-voltage source for producing an arc between electrodes.

FIG. 1 shows an oven according to the invention for heating and fusing together two or more optical fibers during the manufacture of an optical coupler by the method according to the invention.

The oven comprises a frame 106 the upper surface of which comprises a substantially circular recess having a depth equal to about half the height of the frame 106. The following components are provided on the bottom of the recess: a lower electric electrode plate 103, a ceramic disc 101 and an upper electric electrode plate 102, in that order.

A ceramic disc 101 is provided with a central upright hole parallel to the axis of the disc. The hole forms a fusion chamber 104, in which the arc is excited between the electrode plates 102 and 103. The chamber 104 in the disc 101 limits the arc and forces it closer to the fiber than what would be possible in a normal case. The electrode plates 102 and 103, too, are provided with holes 105 for the passage of the fibers to go through, which holes are aligned with the hole 104 in the ceramic disc. The accuracy of the alignment of the holes 105 of the electrode plates 102 and 103 with the chamber 104 affects greatly the moving of the arc on the electrodes. The alignment has to be effected by means of a special instrument, so that it is only inaccuracies in the finishing of the holes of the electrodes that cause deviation from the symmetric structure.

The disc 101 is made of a suitable ceramic or the like material, which has good thermal and electric insulating properties and which withstands the temperature of about 1700° C. required for softening the fibers. In the preferred embodiment of the invention, ceramic Macor ® having a heat resistance of about 1000° C. is used. The amount of heat required for melting the fiber, however, is so small that the temperature of the Macor ® disc does not rise excessively.

The electrode plates are preferably made of tungsten, which during the burning of the arc does not emit atoms to such an extent than other possible electrode materials. This is of importance because the atoms emitted from the electrodes are gathered on the fibers, causing additional attenuation in a finished coupler and deteriorate the coupling.

An annular cover 107 closing the recess of the frame 106 is positioned on the electrode plates 102 and 103 in the recess and the ceramic disc 101. As appears from FIG. 1, the recess of the frame 106 and the lower portion of the cover 107 are so shaped that they surround tightly the disc 101 while leaving an air gap 108 around the circumference of the disc 101. In this way a sufficient breakdown insulation is obtained when the insulation thicknesses and the lengths of the air gaps required by the high voltage to be supplied to the electrode plates have been taken into account in the structure and dimensions of the oven. Naturally, the frame 106, the cover 107 and the disc 101 have to be electrically insulating.

In the preferred embodiment of the invention, the oven frame 106 and the cover are made of teflon having a heat resistance of 300° C. Practice has shown that this is sufficient due to the fact that the burning arc and the hot electrodes are not in direct contact with the teflon parts.

The electrode plates 102 and 103 are secured in place and the high-voltage is applied to the plates by means of metal tubes 109a and 109b. The metal tube, 109a, preferably of copper, is positioned in a central opening in the annular cover 107 in such a manner that the bottom end of the metal tube 109a rests on the upper surface of the upper electrode plate 102, pressing the electrode plate against the disc 101. The top end of the metal tube 109a extends above the cover 107 so that a high-voltage conductor can be coupled thereto. Correspondingly, the other metal tube 109b is positioned in an opening formed in the bottom of the frame 106, and the top end of the tube 109b presses the electrode plate 103 against the lower surface of the ceramic disc 101.

Within each metal tube 109 there is provided a coaxial guide sleeve 110a and 110b, respectively, and ceramic $Al_2O_3$ tubes (alumina) 111a and 111b, respectively, having a heat resistance of about 1700° C. are provided within each guide sleeve. The guide sleeves 110 and the guide tubes 111 center the fibers in the middle of the chamber 104, thus preventing the fibers from adhering to the hot electrodes 102 and 103. The ceramic guide tubes 111 withstand the heat rising from the chamber 104. The guide sleeves 110a and 110b are made of Derlin-Pom ® plastic, for instance. The end portions of the guide sleeves 110 adjacent to the electrode plates taper to a point which does not make contact with the electrode plates 102 and 103 and from which ceramic guide tubes 111 project up to the holes 105 in the electrode plates or, if desired, as far as therewithin.

The optical fibers are inserted through the top end of the guide sleeve 110a and passed through the guide sleeve 110a, the guide tube 111 and the electrode plate 102 into the fusion chamber 104, further out of the chamber 104 through the electrode plate 103, the guide tube 111b and the guide sleeve 110b to the outside of the oven. The point to be fused is positioned between the electrode plates. An arc parallel to the fibers is excited in the chamber when a high voltage of 30 to 40 kV is supplied to the electrode plates 102 and 103 through the metal tubes 109a and 109b.

A d.c. or a.c. arc can be used for heating the optical fiber. Both have their advantages and disadvantages. The advantages of the d.c. arc include the stability of the burning arc and the evenness of the resultant plasma as well as the possibility to control the plasma by means of an external magnetic field. However, rectification and filtration is required on the high-voltage side of the transformer supplying the electrodes for obtaining a d.c. arc. In addition, due to the slowness of high-voltage diodes, the upper frequency limit of the inverter on the primary side of the transformer thereby has to be set at 50 Hz. The d.c. arc wears the cathode electrode more than the anode electrode. In order that the cathode would wear evenly, it is necessary to use a guiding magnetic field. As a consequence, the high-voltage side becomes complicated.

In stability and evenness, the a.c. arc corresponds to the d.c. arc, if the frequency is increased to 10-30 kHz. When using the a.c. arc, the electrodes serve alternately as a cathode and as an anode. For this reason, the wear of the electrodes is less and more even than with the d.c. arc. Due to the relatively high frequency, the arc is excited again after having been extinguished before free atoms have time to recombine, whereby the gas between the electrodes is electrically conductive all the time. Therefore the cathode spot does not move to any greater degree, i.e. the arc remains substantially stationary in relation to the fibers. This can be compensated for by extinguishing the arc for a slightly longer period by simultaneous forced control at a low frequency, preferably about 40 to 400 Hz. The length of the extinguishing pulse is preferably e.g. of the order of 700 to 1000μ s. Too long a pulse extinguishes the arc completely and too short a pulse makes the pulse immovable. In this way, an arc is obtained which changes place arbitrarily; which does not wear down the electrodes; and which rotates arbitrarily around the fiber axis. The hottest point is thereby in the middle of the chamber. In addition, the high-voltage circuit remains simple.

In the preferred embodiment of the invention, an a.c. arc is used. In the following, a high-voltage transformer and an inverter used in the preferred embodiment will be described to some extent.

The secondary of the high-voltage transformer should resist peak voltages of several tens of kilovolts. The required resistance is lower if the transformer is used for producing short sparks. In the preferred embodiment of the invention, a transformer structure is used in which a primary winding and two series-connected secondary windings with a grounded center are wound around a ferrite core. The secondary windings are wound around a 10-compartment Derlin-Pom ® plastic core. The transformation ratio of the transformer is 280.

In the preferred embodiment of the invention, the inverter is a half-bridge coupling according to FIG. 2. Other alternatives include push-pull and full-bridge couplings. The power semiconductor was a N-FET, which is easily controllable e.g. by means of a purpose-made commercial microcircuit, such as Motorola SG-3525, via pulse transformers. A half-bridge is easy to tune up to the resonance frequency of the high-voltage transformer, and the resonance frequency is relatively easy to adjust by varying the values of the capacitor. The efficiency of the arc can be adjusted by varying the control frequency and, as a consequence, the frequency of the arc.

In the half-bridge coupling, one end portion $P_1$ of the primary winding of the high-voltage transformer $T_1$ is connected between two series-connected capacitors $C_1$ and $C_2$ connected to earth at the operating voltage. The other end portion $P_2$ of the primary winding of the transformer $T_1$ is connected between two series-connected FETs $TR_2$ and $TR_4$ connected to earth at the operating voltage. By controlling the FETs $TR_2$ and $TR_4$ one feed point $P_2$ of the primary winding of the transformer $T_1$ is connected alternately to earth and to the operating voltage, whereby at best the voltage at a point between the capacitors $C_1$ and C obtains a value which is three times that of the operating voltage. The output voltage is restricted by the power resistance of the FETs and the impedance of the load. Before an arc is excited, short current peaks having magnitudes as high as tens of amperes are passed through the FETs $TR_2$ and $TR_4$. They are partly due to the slowness of the FETs. The current resistance of the coupling is increased by connecting another FET $TR_1$ and $TR_3$, respectively, in parallel with the FETs $TR_2$ and $TR_4$. The biggest problem in the construction of an inverter has been the sufficient protection of the FETs. The problem is seriously aggravated when the load is inductive and, as in this particular case, also varies depending on whether the arc is burning or whether it is about to be produced. The basic structure of a half-bridge is not, either, easy in view of the protection. Firstly, the control of the FETs, that is, the gate-source poles, should be protected against excess voltages. The gate-source interval withstand a voltage of no more than ±20 V. The problem is due to the fact that the voltage peaks within the drain-source interval are connected through stray capacitances to the gate-source interval, too. Secondly, the drain-source interval, too, should be protected against excess voltages although it has a reasonable voltage resistance (450 V).

A problem with excess voltage protection is that coupling peaks caused by an inductive load are rapid. In addition to this, the FETs have to be protected against current peaks. A further serious problem is the warming up caused by the coupling losses of the FETs. Even though the used FETs are relatively rapid, they do not withstand the resultant heat losses without a separate protection especially as their current resistance drops considerably with increasing temperature. This problem is solved by means of the coupling of FIG. 2, in which the rate of current rise is decreased when the FET begins to conduct and the rate of voltage rise is decreased when it the FET is closed. The excess energy is stored either in the inductance or capacitance and concerted into heat in a dumping resistor. When passive components are used, the efficiency is not improved. If active components are added to the coupling, it is possible to partially recover the power previously consumed in coupling losses. In this particular case, this is not sensible due to the small losses (max about 20 W).

Figure 3:
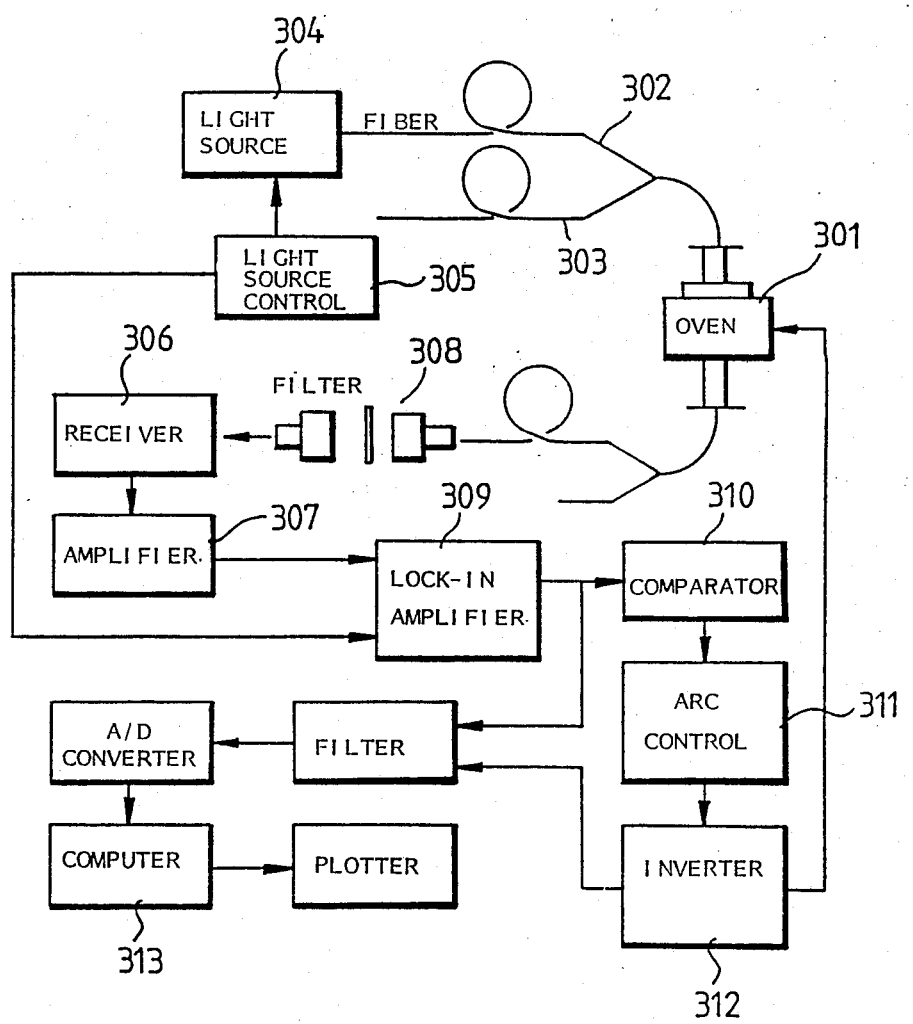
FIG. 3 is a block diagram of a system comprising an oven according to the invention for the manufacture of optical couplers.

FIG. 3 shows by way of example one way of manufacturing optical couplers applying the method and the oven according to the invention.

For the feedback of the process, the luminosity of the fibers passed into the oven 301 is measured by applying light to the fiber 302 from a light source 304 and by measuring the intensity of the light at the other end of the fiber by means of a receiver 306. The wave length to be measured is selected by means of a filter 308. The received signal is applied through an amplifier 307 to a lock-in amplifier 309 which separates the proper signal apart from noises on the basis of a signal from the control 305 of the light source. The output of the amplifier 309 comprises a comparator 310 which compares the received luminosity with a preset threshold value and applies a signal to an arc control unit 311 for cutting off the arc when the threshold value is obtained, i.e., the coupling of the fibers takes place. In addition, the current of the inverter 312 is measured, which contains not only the setting of power but also information on the moment when the arc has been excited and when it has been extinguished. The results obtained from the measuring of both the luminosity of the fiber and the current of the inverter are stored in a computer, because the process is so rapid that its monitoring in some other way is practically impossible.

In outlines, the process takes places as follows.

At first, the fibers are stripped and cleansed over a distance of about 6 cm. Then they are glued together adjacent to the stripped portions. The fibers are twisted around each other 4 to 10 times in order to bring them into tight contact with each other, whereafter they are glued together at one end of the stripped portion. Then they are led through a glass tube and the oven 301. The fibers are secured to the oven 301 at the top and they are subjected to a tension stress by means of a drawing means well-known in the art and positioned at the bottom. At its simplest, the drawing means may be formed by a weight of about 10 g which is attached to the bottom portion of the fibers. The glass tube is used for enclosing the coupler. Before fusing the coupler, the light permeability of the fiber is measured and the value of the comparator 310 is set. When the process is controlled on the basis of the power to be connected, the comparator is initially set to be responsive to a very low luminosity. Thereby the fiber will not break before the extinguishing of the arc.

For initiating the process, a voltage is connected to the inverter 312 and to the light arc control 311. The arc is excited in the oven when a start button is pressed, because the frequency of the inverter 312 is then converted to the resonance frequency of the high-voltage transformer. While in resonance, the highest voltage is produced in the transformer. After the arc has been excited, the resonance frequency is increased. The coupling also increases the control frequency, whereby the efficiency of the arc increased. By adjusting the control frequency, the efficiency of the arc can be adjusted. The power adjustments can also be varied by cutting off the control voltage, so this technique can also be used in the power adjustment, if desired. When the fusion of the fibers takes place relatively suddenly, there occurs connection of the light from one fiber to the other. The comparator cuts off the arc in response to this. The residual heat of the oven 301 is not sufficient to break off the fiber. In this way the two fibers are fused together so as to form a taper having the length of 1 to 3 cm.

The drawings and the description related thereto are only intended to illustrate the present invention. In their details, the method and the oven according to the invention may vary within the scope of the attached claims and within the basic idea of the invention.

We claim:

1. A method for the manufacture of an optical fiber coupler from at least two optical fibers, each having an outer covering of jacket material, the method comprising the steps of:
    removing the covering of jacket material from one end of each of the optical fibers for exposing a predetermined length of each fiber;
    bringing the exposed lengths of fiber into physical contact with each other within a contact area;
    fusing the optical fibers together by subjecting the optical fibers within the contact area to the heat of an arc extending substantially parallel to the longitudinal extent of the optical fibers; and
    drawing the fused optical fibers into a taper.

2. The method of claim 1, wherein the step of subjecting the optical fibers to the heat of an arc includes:
    striking the arc at a plurality of locations within the contact area around the fibers for uniformly heating the fibers in a radial direction.

3. The method of claim 2, wherein the step of striking the arc includes:
    applying alternately an exciting and extinguishing voltage at a predetermined frequency.

4. The method of claim 3, wherein the step of striking the arc includes striking a d.c. arc.

5. The method of claim 3, wherein the step of striking the arc includes striking an A.C. arc having an alternating voltage frequency in the range of approximately 10 kHz to 32 kHz.

6. The method of claim 3, wherein the predetermined frequency of the alternately applied exciting and extinguishing voltages is in the range of from approximately 40 to 500 Hz.

7. The method of claim 4, wherein the predetermined frequency of the alternately applied exciting and extinguishing voltage is in the range of from approximately 40 to 500 Hz.

8. The method of claim 5, wherein the predetermined frequency of the alternately applied exciting and extinguishing voltages is in the range of from approximately 40 to 500 Hz.

9. The method of claim 1, 2, 3, 4, 5, 6, 7, or 8, wherein the step of bringing the optical fibers together within the contact area includes:
    bringing the optical fibers together in a confined contact area; and
    dimensioning of the contact area in a direction substantially normal to the longitudinal extent of the optical fibers for forcing the location of the arc within the contact area in close proximity to the optical fibers.

10. An apparatus for fusing at least two optical fibers together during manufacture of an optical coupler, comprising:
    a ceramic member having a fusion chamber open at opposite ends therein;
    first and second electrodes spaced from one another along an axis at respective opposite ends of the chamber adjacent the ceramic member;
    means for permitting the disposition of the at least two optical fibers in the fusion chamber longitudinally between the first and second electrodes; and
    means for striking an arc extending between the first and second electrodes substantially parallel to the axis.

11. The apparatus of claim 10, wherein the ceramic member comprises a disc having planar opposite external surfaces with an axially extending central through hole constituting the fusion chamber; and
    the first and second electrodes, each comprises a plate having a hole therein aligned with the through hole of the disc, and the disposition permitting means includes the fusion chamber and the aligned electrode holes.

12. The apparatus of claim 11, wherein the means for striking an arc comprises means for striking an A.C. arc.

13. The apparatus of claim 12, wherein the means for striking an A.C. arc includes means for striking an A.C. arc having a frequency in the range of approximately 10 to 35 kHz.

14. An apparatus according to claims 9, 10, 11, 12, or 13 further comprising means for applying alternately an exciting and extinguishing voltage to the arc striking means at a frequency in the range of approximately 40 to 500 Hz.

* * * * *